United States Patent [19]

Katayama et al.

[11] Patent Number: 5,379,325
[45] Date of Patent: Jan. 3, 1995

[54] CLOCK GENERATING APPARATUS, DATA TRANSMITTING/RECEIVING APPARATUS AND DATA TRANSMITTING/RECEIVING METHOD

[75] Inventors: Toshiyuki Katayama, Hitachi; Norihiko Sugimoto, Katsuta; Shunji Inada; Seiji Kamada, both of Hitachi, all of Japan

[73] Assignees: Hitachi, Ltd., Tokyo; Hitachi Engineering Co., Ltd., Ibaraki, both of Japan

[21] Appl. No.: 767,878

[22] Filed: Sep. 30, 1991

[30] Foreign Application Priority Data

Sep. 28, 1990 [JP] Japan .................. 2-259998

[51] Int. Cl.⁶ .................. H04L 7/00; H03L 7/00
[52] U.S. Cl. .................. 375/106; 375/110; 326/93; 327/256; 327/295
[58] Field of Search .............. 375/106, 108, 109, 110; 370/100.1; 307/471, 479, 480, 269, 272.2, 272.3; 340/825.2; 328/63, 72, 155

[56] References Cited

U.S. PATENT DOCUMENTS

| | | | |
|---|---|---|---|
| 4,521,897 | 6/1985 | Merrell | 328/72 |
| 4,694,196 | 9/1987 | Hasley et al. | 328/63 |
| 4,926,445 | 5/1990 | Robb | 375/106 |
| 4,926,451 | 5/1990 | Yoshihara et al. | 328/63 |
| 5,173,618 | 12/1992 | Eisenstadt | 328/105 |

FOREIGN PATENT DOCUMENTS 57-116459  7/1982  Japan .

*Primary Examiner*—Stephen Chin
*Assistant Examiner*—Young Tse

[57] ABSTRACT

A data transmitting/receiving apparatus comprises a master clock signal and a slave clock signal which differ in phase with each other according to a basic clock signal. Serial data is input according to the produced master clock signal or slave clock signal, a protocol process is applied to the input serial data, and the serial data subjected to the protocol process is output according to the master clock signal or the slave clock signal. A start delimiter detecting signal is generated when a start delimiter indicating the first frame is detected in the input serial data and phases are exchanged between the master clock signal and the slave clock signal when there arises a shift on a bit boundary of the serial data when the start delimiter detecting signal is generated. The serial data is output according to the master clock signal or the slave clock signal having their phases exchanged with each other, thus the serial data is transmitted without delay despite a shift arising on the bit boundary of the serial data.

9 Claims, 9 Drawing Sheets

CLOCK GENERATING APPARATUS, DATA TRANSMITTING/RECEIVING APPARATUS AND DATA TRANSMITTING/RECEIVING METHOD

BACKGROUND OF THE INVENTION

1. Field of the Invention

This invention relates to a clock generating apparatus, a data transmitting/receiving apparatus and a method thereof: and is particularly concerned with a clock generating apparatus, a data transmitting/receiving apparatus and a method thereof intended preferably for generating a non-overlap 2-phase clock signal according to a basic clock signal and transmitting and receiving data according to the 2-phase clock signal.

2. Description of the Prior Art

In a data transmitting/receiving apparatus used for a local area network system, for transmitting and receiving a serial data, employed hitherto is a method wherein a non-overlap 2-phase clock signal is generated from a basic clock signal, a master clock signal and a slave clock signal are generated from the 2-phase clock signal, serial data with the phase lagging 0.5 bits from serial data input further is generated other than the input serial data, and each serial data is transmitted according to a master clock signal or a slave clock signal.

Further, for transmitting the serial data, the serial data is transmitted in half-bits with data of a start delimiter constructed of an 8-bit long bit pattern placed ahead of the frame. Then, the serial data is received only at the time when each communication station detects the start delimiter. However, when the start delimiter is detected from a transmitted data, whether or not it indicates the start delimiter is detected from a configuration of the bit pattern. Thus, according to the method whereby the bit pattern (pattern by combination of 2 bits) is detected from the transmitted data in half-bits, there may be a case where data is read with the combination of data constructing the bit pattern shifted 0.5 bits according to how the data is input. In such case, a shift of 0.5 bits may arise on a bit boundary of the serial data. Now, therefore, a method for preventing a data error from resulting by correcting a phase of the serial data according to a master clock signal and a slave clock signal is employed when a shift occurs on the bit boundary of the serial data. That is, when a shift arises on the bit boundary when transmitting a basic serial data according to the master clock signal, serial data with the phase lagging 0.5 bits from the basic serial data is transmitted according to the slave clock signal, thereby preventing an error from arising on the data transmission.

In the aforementioned prior art, since serial data is selected for transmission according to the master clock signal and the slave clock signal, when the serial data with the phase lagging 0.5 bits from a basic serial data is selected as data for transmission, data transmission is delayed, and such delay in the data transmission becomes serious particularly in the system for which a high throughput is required of the data transmission.

SUMMARY OF THE INVENTION

An object of this invention is to provide a data transmitting/receiving apparatus, a data transmitting/receiving method and a local area network communication transmitting/receiving apparatus capable of transmitting data without delay even when a shift occurs on a bit boundary of transmitted data.

Another object of this invention is to provide a clock generating apparatus allowing a plurality of clock signals to exchange phases mutually according to a specified incoming signal.

In order to attain the aforementioned objects, the invention comprises, as a first apparatus, a data transmitting/receiving apparatus having 2-phase clock signal generating means for generating 2-phase clock signals different in phase according to an incoming signal and a basic clock signal, master clock signal generating means for generating a master clock signal on a logical product of one signal of the 2-phase clock signals and the basic clock signal; slave clock signal generating means for generating a slave clock signal on a logical product of another signal of the 2-phase clock signals and the basic clock signal; period initializing signal generating means for generating a period initializing signal upon detection of a specific bit pattern of serial data input through a data transmission line, logical means for generating the signal working subject to a logical sum of the period initializing signal and one signal of the 2-phase clock signals as an incoming signal to the 2-phase clock signal generating means; data input means for inputting serial data according to either the master clock signal or the slave clock signal, protocol processing means for applying a protocol process to the serial data input by the data input means; and data output means for outputting the serial data processed by the protocol processing means in sequence to the data transmission line according to either the master clock signal or the slave clock signal.

The invention then comprises, as a second apparatus, a data transmitting/receiving apparatus having 2-phase clock signal generating means for generating 2-phase clock signals different in phase according to an incoming signal and a basic clock signal; master clock signal generating means for generating a master clock signal on a logical product of one signal of the 2-phase clock signals and the basic clock signal; slave clock signal generating means for generating a slave clock signal on a logical product of another signal of the 2-phase clock signals and the basic clock signal; period turnover signal generating means for generating a period turnover signal upon detection of a specific bit pattern of serial data input through a data transmission line, logical means for generating the signal working subject to an exclusive OR of the period turnover signal and one signal of the 2-phase clock signals as an incoming signal to the 2-phase clock signal generating means; data input means for inputting serial data according to either the master clock signal or the slave clock signal, protocol processing means for applying a protocol process to the serial data input by the data input means; and data output means for outputting the serial data processed by the protocol processing means in sequence to the data transmission line according to either the master clock signal or the slave clock signal.

The invention further comprises, as a third apparatus, a Local area network communication transmitting/receiving apparatus operating as a data transmitting/receiving apparatus of a communication station disposed in a data transmission line, having 2-phase clock signal generating means for generating 2-phase clock signals different in phase according to an incoming signal and a basic clock signal; master clock signal generating means for generating a master clock signal on a logical product of one signal of the 2-phase clock signals and the basic clock signal; slave clock signal generating means for generating a slave clock signal on a logical product of another signal of the 2-phase clock signals and the basic clock signal; period initializing signal generating means for generating a period initializing signal upon detection of a specific bit pattern of serial data input through a data transmission line; logical means for generating the signal working subject to a logical sum of the period initializing signal and one signal of the 2-phase clock signals as an incoming signal to the 2-phase clock signal generating means; data input means for inputting serial data according to either the master clock signal or the slave clock signal; protocol processing means for applying a protocol process to the serial data input by the data input means; and data output means for outputting the serial data processed by the protocol processing means in sequence to the data transmission line according to either the master clock signal or the slave clock signal.

Still further, the invention comprises, as a fourth apparatus, a local area network communication transmitting/receiving apparatus operating as a data transmitting/receiving apparatus of a communication station disposed in a data transmission line, having 2-phase clock signal generating means for generating 2-phase clock signals different in phase according to an incoming signal and a basic clock signal; master clock signal generating means for generating a master clock signal on a logical product of one signal of the 2-phase clock signals and the basic clock signal, slave clock signal generating means for generating a slave clock signal on a logical product of another signal of the 2-phase clock signals and the basic clock signal; period turnover signal generating means for generating a period turnover signal upon detection of a specific bit pattern of serial data input through a data transmission line; logical means for generating the signal working subject to an exclusive OR of the period turnover signal and one signal of the 2-phase clock signals as an incoming signal to the 2-phase clock signal generating means; data input means for inputting serial data according to either the master clock signal or the slave clock signal; protocol processing means for applying a protocol process to the serial data input by the data input means; and data output means for outputting the serial data processed by the protocol processing means in sequence to the data transmission line according to either the master clock signal or the slave clock signal.

The invention then comprises, as a fifth apparatus, a clock generating apparatus having 2-phase clock signal generating means for generating 2-phase clock signals different in phase according to an incoming signal and a basic clock signal; master clock signal generating means for generating a master clock signal on a logical product of one signal of the 2-phase clock signals and the basic clock signal; slave clock signal generating means for generating a slave clock signal on a logical product of another signal of the 2-phase clock signals and the basic clock signal; and logical means for generating the signal working subject to a logical sum of a period initializing signal synchronized with the basic clock signal and one signal of the 2-phase clock signals as an incoming signal to the 2-phase clock signal generating means.

The invention comprises, as a sixth apparatus, a clock generating apparatus having 2-phase clock signal generating means for generating 2-phase clock signals different in phase according to an incoming signal and a basic clock signal; master clock signal generating means for generating a master clock signal on a logical product of one signal of the 2-phase clock signals and the basic clock signal; slave clock signal generating means for generating a slave clock signal on a logical product of another signal of the 2-phase clock signals and the basic clock signal; and logical means for generating the signal working subject to an exclusive OR of a period turnover signal synchronized with the basic clock signal and one signal of the 2-phase clock signals as an incoming signal to the 2-phase clock signal generating means.

The invention then comprises, as a seventh apparatus, a clock generating apparatus having 2-phase clock signal generating means for generating 2-phase clock signals different in phase according to an incoming signal and a basic clock signal; master clock signal generating means for generating a master clock signal on a logical product of one signal of the 2-phase clock signals and the basic clock signal; slave clock signal generating means for generating a slave clock signal on a logical product of another signal of the 2-phase clock signals and the basic clock signal; period initializing signal generating means for generating a period initializing signal synchronized with the basic clock signal upon detection of a specific bit pattern of serial data input through a data transmission line; and logical means for generating the signal working subject to a logical sum of the period initializing signal and one signal of the 2-phase clock signals as an incoming signal to the 2-phase clock signal generating means.

Further, the invention comprises, as an eighth apparatus, a clock generating apparatus having 2-phase clock signal generating means for generating 2-phase clock signals different in phase according to an incoming signal and a basic clock signal; master clock signal generating means for generating a master clock signal on a logical product of one signal of the 2-phase clock signals and the basic clock signal; slave clock signal generating means for generating a slave clock signal on a logical product of another signal of the 2-phase clock signals and the basic clock signal; period turnover signal generating means for generating a period turnover signal synchronized with the basic clock signal upon detection of a specific bit pattern of serial data input through a data transmission line, and logical means for generating the signal working subject to an exclusive OR of one signal of the 2-phase clock signals and the period turnover signal as an incoming signal to the 2-phase clock signal generating means.

As a first method, the invention comprises employing a data transmitting/receiving method wherein 2-phase clock signals different in phase are generated according to a basic clock signal; a master clock signal is produced subject to a logical product of one signal of the 2-phase clock signals and the basic clock signal; a slave clock signal is produced subject to a logical product of another signal of the 2-phase clock signals and the basic clock signal; serial data is input according to either the master clock signal or the slave clock signal; and when a shift occurs on a bit boundary of the serial data for outputting according to the master clock signal or the slave clock signal after a protocol process is applied to the input serial data, phases of the master clock signal and the slave clock signal are exchanged with each other, then the serial data is transmitted and received according to either of the master clock signal or the slave clock signal having the phases exchanged with each other.

When a shift occurs on a bit boundary of the serial data for transmitting the serial data according to the master clock signal or the slave clock signal, phases of the master clock signal and the slave clock signal are exchanged with each other, and the serial data is transmitted according to a specified clock signal of the master clock signal and the slave clock signal having the phases exchanged with each other, therefore the serial data can be transmitted without delay, and thus a throughput in the data transmission can be kept from deteriorating.

DETAILED DESCRIPTION OF PREFERRED EMBODIMENTS

One preferred embodiment of the invention will now be described with reference to the accompanying drawings.

Figure 1:
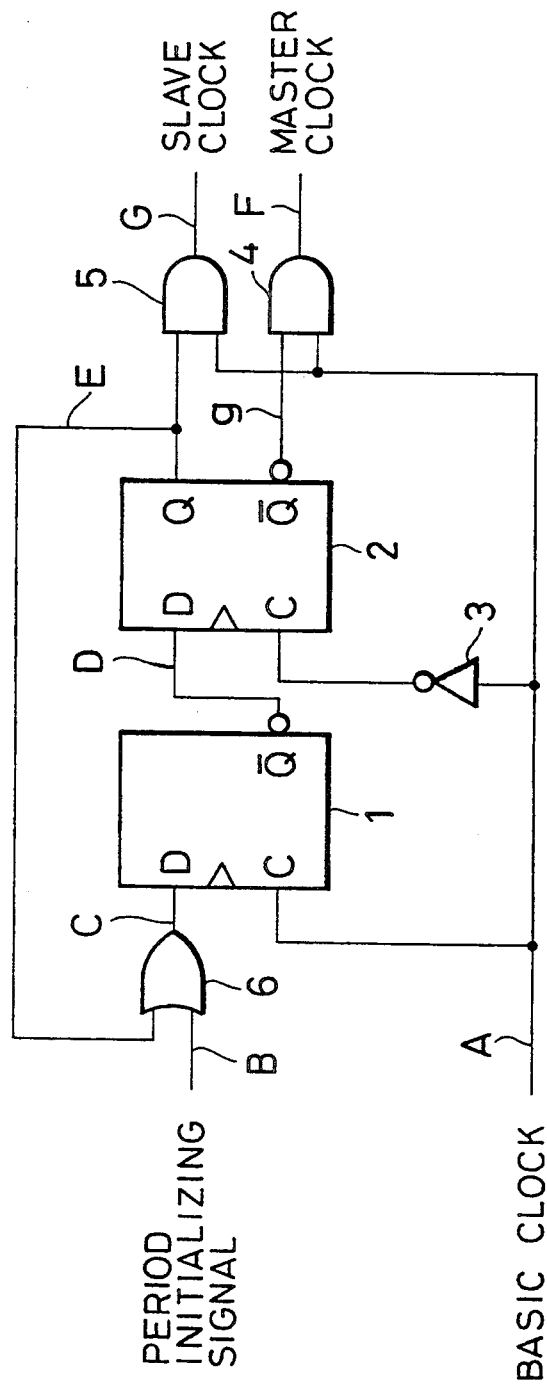
FIG. 1 is a block diagram of a clock generating apparatus.

In FIG. 1, a clock generating apparatus comprises frequency dividing flip-flops 1, 2, an inverter 3, and AND gates 4, 5 and an OR gate 6. A period initializing signal from a period initializing signal generating apparatus for generating the period initializing signal is input to one input terminal of the OR gate 6, and a basic clock signal is input to the flip-flops 1, 2 and the AND gates 4, 5. The period initializing signal generating apparatus loads serial data transmitted in half-bits, and upon detecting that data relating to a start delimiter indicating a start of data transmission (or a data by an 8-bit long bit pattern) is included in the serial data, it generates the period initializing signal synchronized with the basic clock signal.

Figure 2:
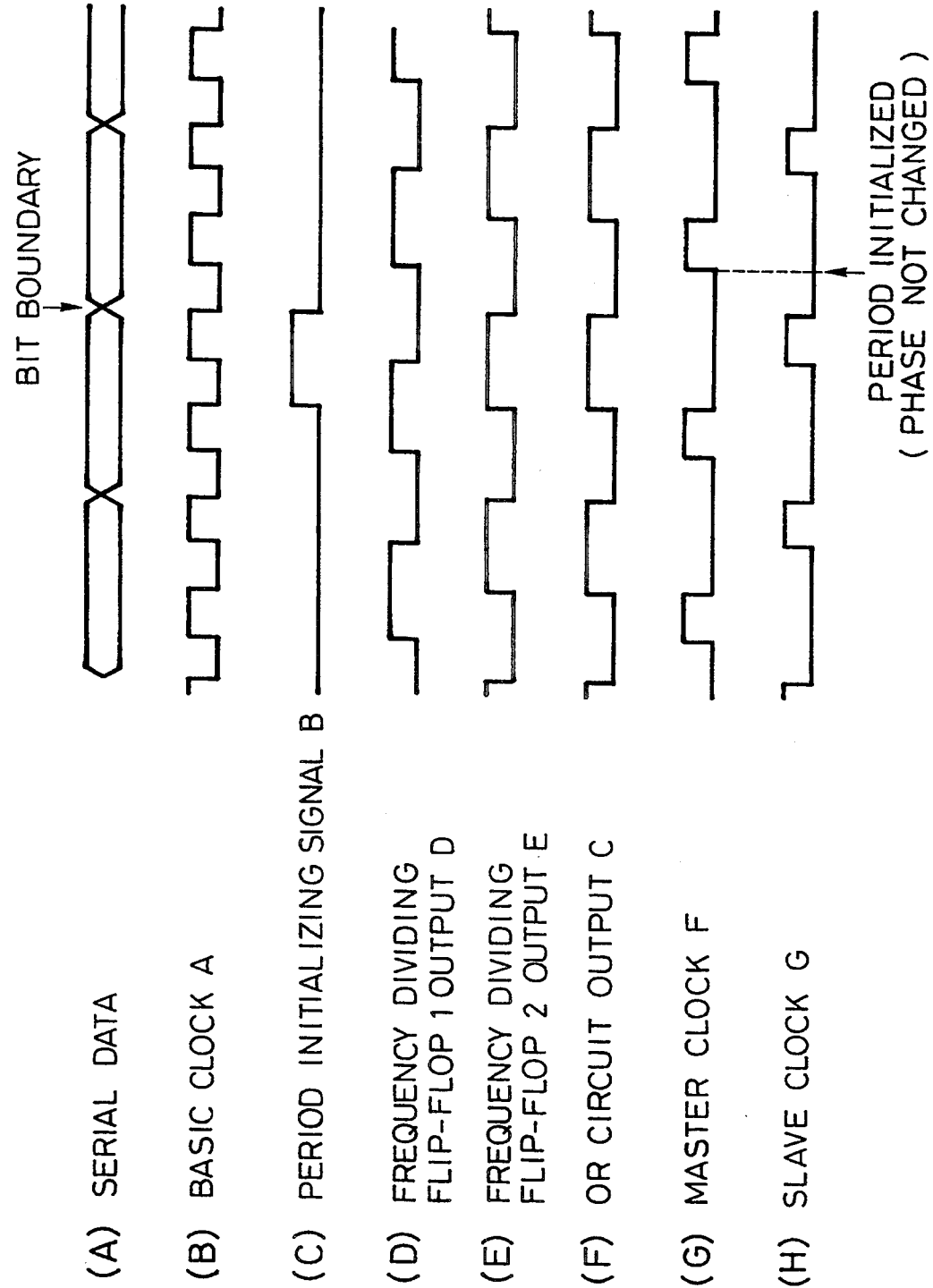
FIG. 2 is a time chart for illustrating an operation when a bit boundary is not shifted from using the apparatus shown in FIG. 1.

The flip-flops 1, 2 are constructed of an edge trigger type D-flip-flop answering to a pulse rise, and when the basic clock signal shown in FIG. 2 is input to a clock terminal of the flip-flop 1, a signal shown in FIG. 2(D) is generated from a $\bar{Q}$ terminal of the flip-flop 1. Then, when the basic clock signal is input to a clock terminal of the flip-flop 2 through the inverter 3, a signal shown in FIG. 2(E) is generated from a Q terminal of the flip-flop 2, and a turnover signal is generated from the Q terminal. That is, the flip-flops 1, 2 and the inverter 3 are constructed as 2-phase clock signal generating means. Then, an output of the Q terminal of the flip-flop 2 is fed back to another input terminal of the OR gate 6 and is also input to the AND gate 5, and an output of the $\bar{Q}$ terminal is input to the AND gate 4. When an outgoing signal of the flip-flop 2 is input to the AND gates 4, 5 each, the master clock signal is generated from the AND gate 4 as a clock signal different in phase according to the basic clock signal as shown in FIG. 2(G), (H), and the slave clock signal is generated from the AND gate 5. That is, the AND gate 4 is constructed as master clock signal generating means, and the AND gate 5 is constructed as slave clock signal generating means.

On the other hand, an outgoing signal of the flip-flop 2 and a period initializing signal are input to the OR gate 6, and the same signal as an outgoing signal of the Q terminal of the flip-flop 2 is generated normally from the OR gate 6, as shown in FIG. 2(F). Then, a period is initialized when the period initializing signal synchronized with the basic clock signal is input to the OR gate 6. If there arises no shift on a bit boundary of the serial data, then a phase of the period initializing signal coincides with a pulse generated from the Q terminal of the flip-flop 2, and a pulse same in phase as the pulse generated from the Q terminal of the flip-flop 2 is output in sequence from the OR gate 6. Thus, phases are not exchanged between the master clock signal and the slave clock signal in this case, and the master clock signal and the slave clock signal are generated alternately in the existing timing.

Figure 3:
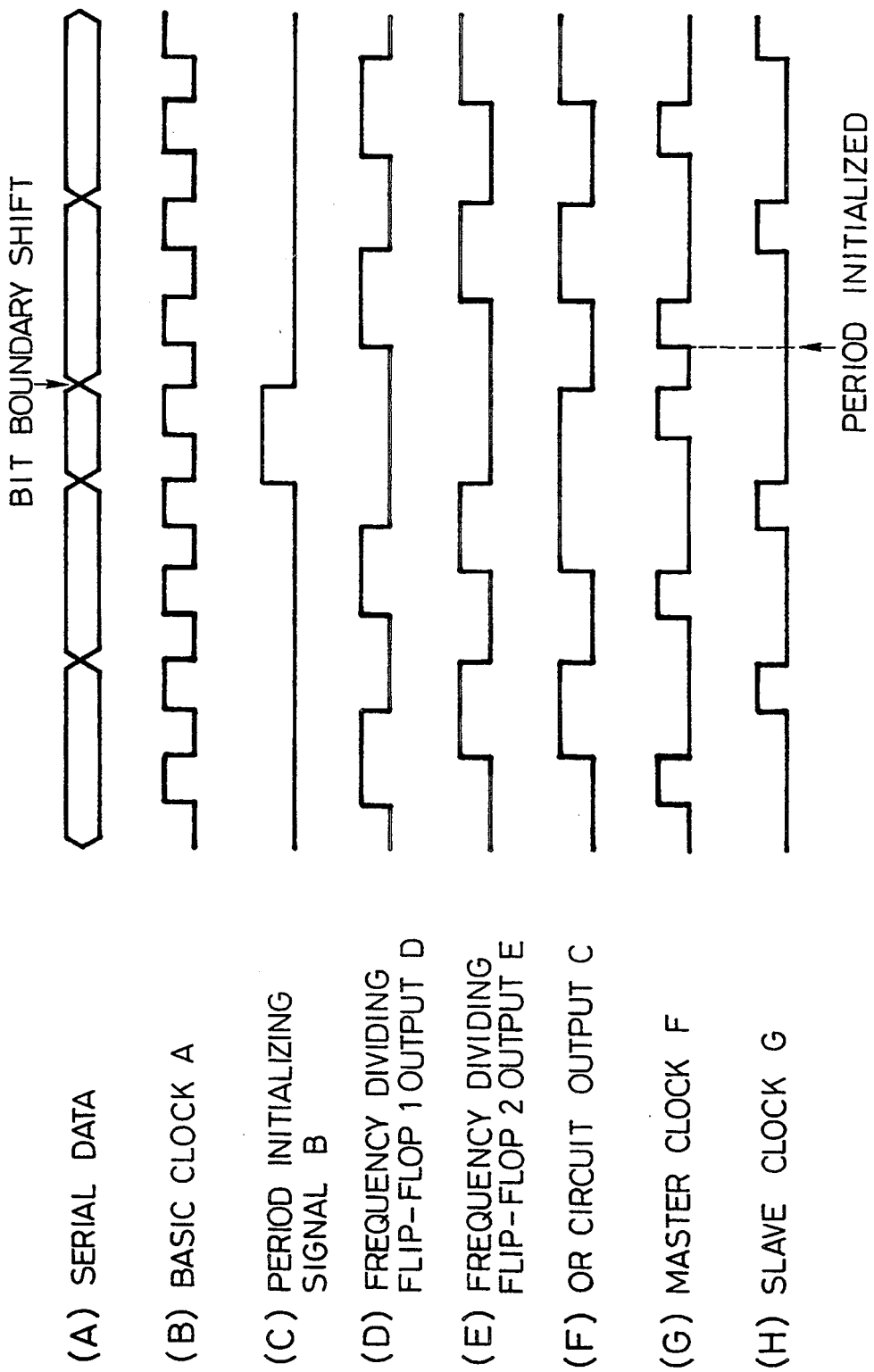
FIG. 3 is a time chart for illustrating an operation when the bit boundary is shifted from using the apparatus shown in FIG. 1.

Next, as shown in FIG. 3, when the period initializing signal is generated from a shift arising on a bit boundary of the serial data, the period initializing signal is input to the OR gate 6 in a phase different from the pulse output from the Q terminal of the flip-flop 2. Thus, an output level of the OR gate 6 is kept high for the term of 0.5 bits, and an output level of the flip-flop 1 is also kept high for the term of 0.5 bits without being inverted to a low level. Thus, a level of the Q terminal is kept high despite coming to a low level or low despite coming to a high level, the period of high level and low level being inverted consequently.

Now, therefore, the period is initialized between the master clock signal and the slave clock signal which are outgoing signals of the AND gates 4, 5. The initialization is effected only after one period from the period initializing signal being input to the basic clock signal being input. Phases are exchanged between the master clock signal and the slave clock signal by the initialization effected as above. Then the serial data will be transmitted according to either the master clock signal or the slave clock signal, having exchanged phases with each other. Accordingly, irrespective of a shift arising on a bit boundary of the serial data, the serial data can be transmitted without delay simply by exchanging phases of the master clock signal and the slave clock signal.

Figure 4:
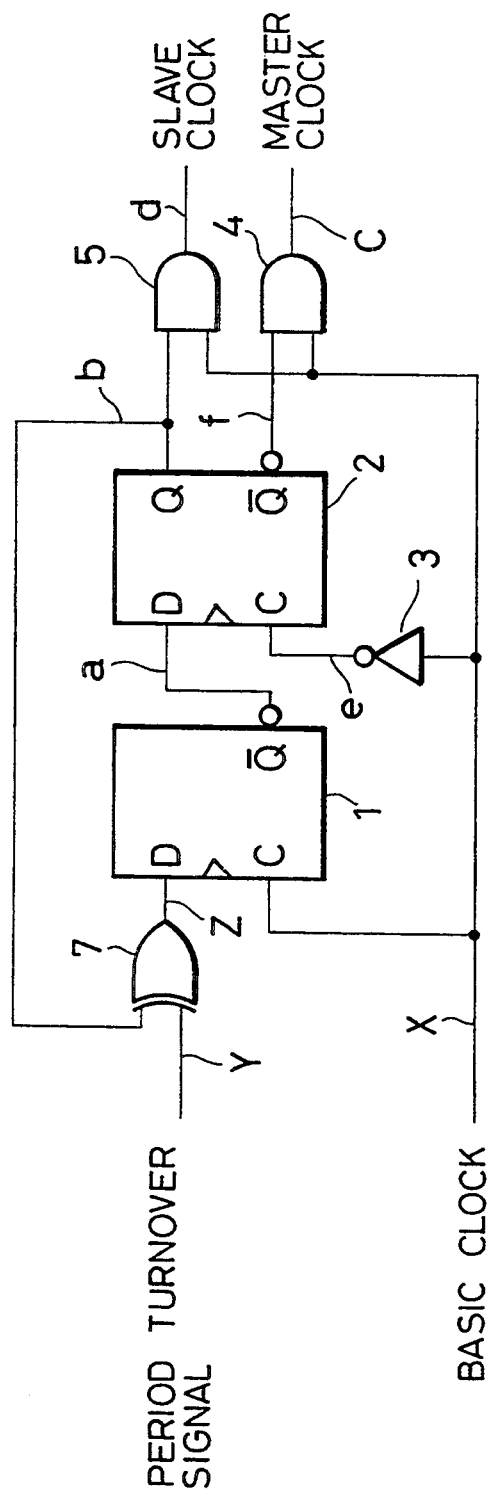
FIG. 4 is a block diagram showing another embodiment of the clock generating apparatus.

Next, as shown in FIG. 4, an Ex-OR gate 7 is provided as logical means instead of the OR gate 6 of FIG. 1. Thus when a specific bit pattern of the serial data input through a data transmission line, or, for example, a bit pattern for indicating a command to forcibly execute a phase exchange between the master clock signal and the slave clock signal, or a bit pattern for indicating a shift arising on the bit boundary is detected, simply from inputting a period turnover signal from period turnover signal generating means for generating the period turnover signal to one input terminal of the Ex-OR gate 7, the phases of the master clock signal and the slave clock signal can be forcibly exchanged according to the period turnover signal.

Figure 5:
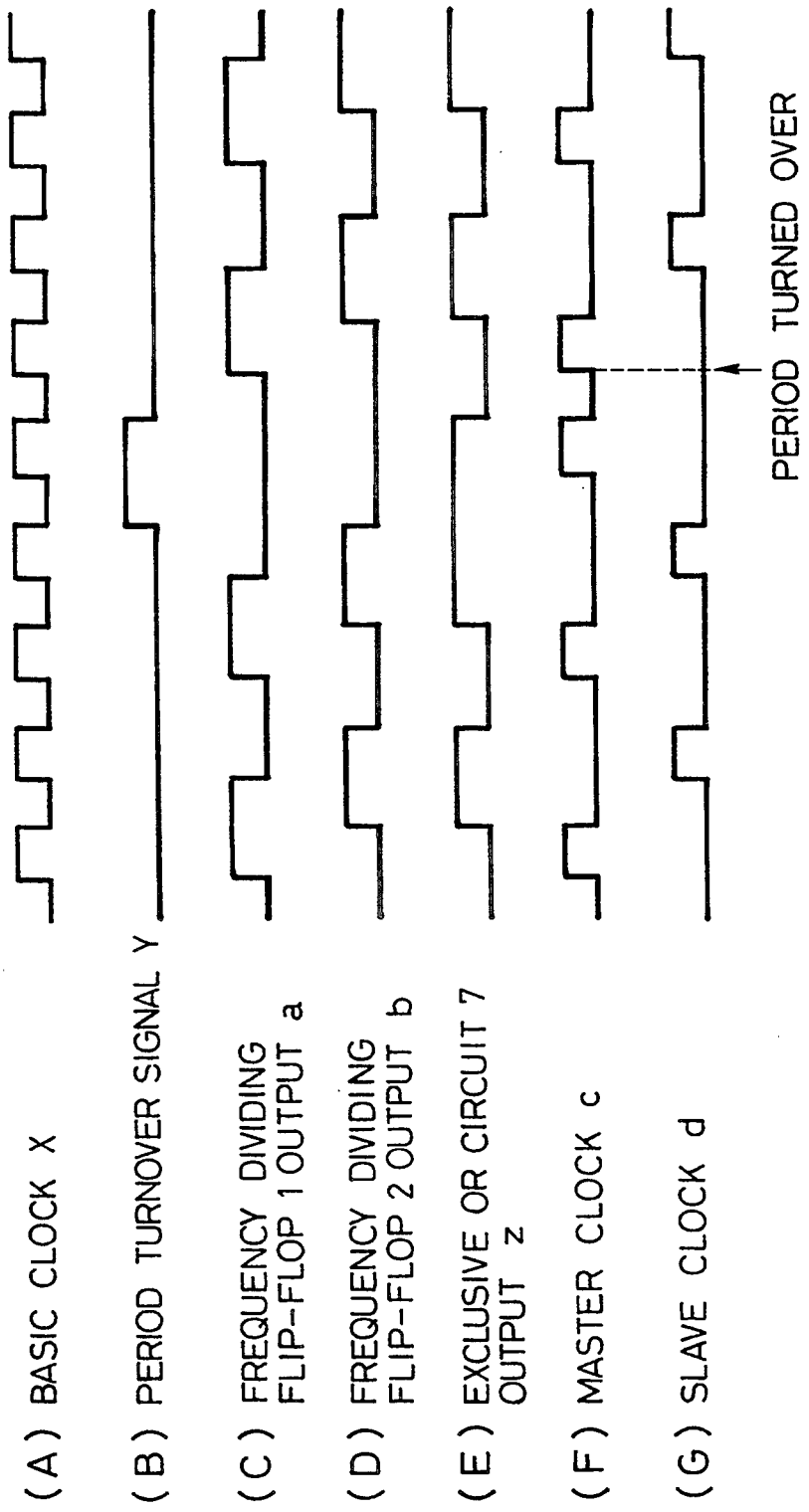
FIG. 5 is a time chart for illustrating an operation of the apparatus shown in FIG. 4.

In this embodiment, as shown in FIG. 5, while the master clock signal and the slave clock signal, differing in phase with each other, are output from the AND gates 4, 5 respectively according to the basic clock signal, if the period turnover signal is input to the gate 7, an output level of the gate 7 is kept high for the term of 0.5 bits without being inverted to a low level. In this case, an output level of the flip-flop 1 is also kept high longer for the term of 0.5 bits. Thus, the Q terminal of the flip-flop 2 is kept at a low level for the term of 0.5 bits, and phases are exchanged between the master clock signal and the slave clock signal. That is, the period is forcibly inverted by the period turnover signal between the master clock signal and the slave clock signal. In this case, when the period turnover signal is input, the period of the master clock signal and the slave clock signal is inverted necessarily regardless of a logical value of the Q terminal of the flip-flop 2.

Thus, when a shift occurs on a bit boundary of the serial data, the period turnover signal is input to the gate 7 to mutually invert periods of both block signals, and from transmitting the serial data according to the master clock signal or the slave clock signal having the periods interved each other, the serial data can be transmitted without delay, even if there arises a shift on the bit boundary of the serial data.

According to this embodiment, since the periods of both clock signals can be forcibly inverted from inputting the period turnover signal, a circuit for controlling a timing whereat the period turnover signal is generated may be simplified as compared with the embodiment given in FIG. 1. That is, when the period turnover signal is generated 0.5 bits shifted from the timing shown in FIG. 5, the periods are turned over in response to a rise of the slave clock signal.

Figure 6:
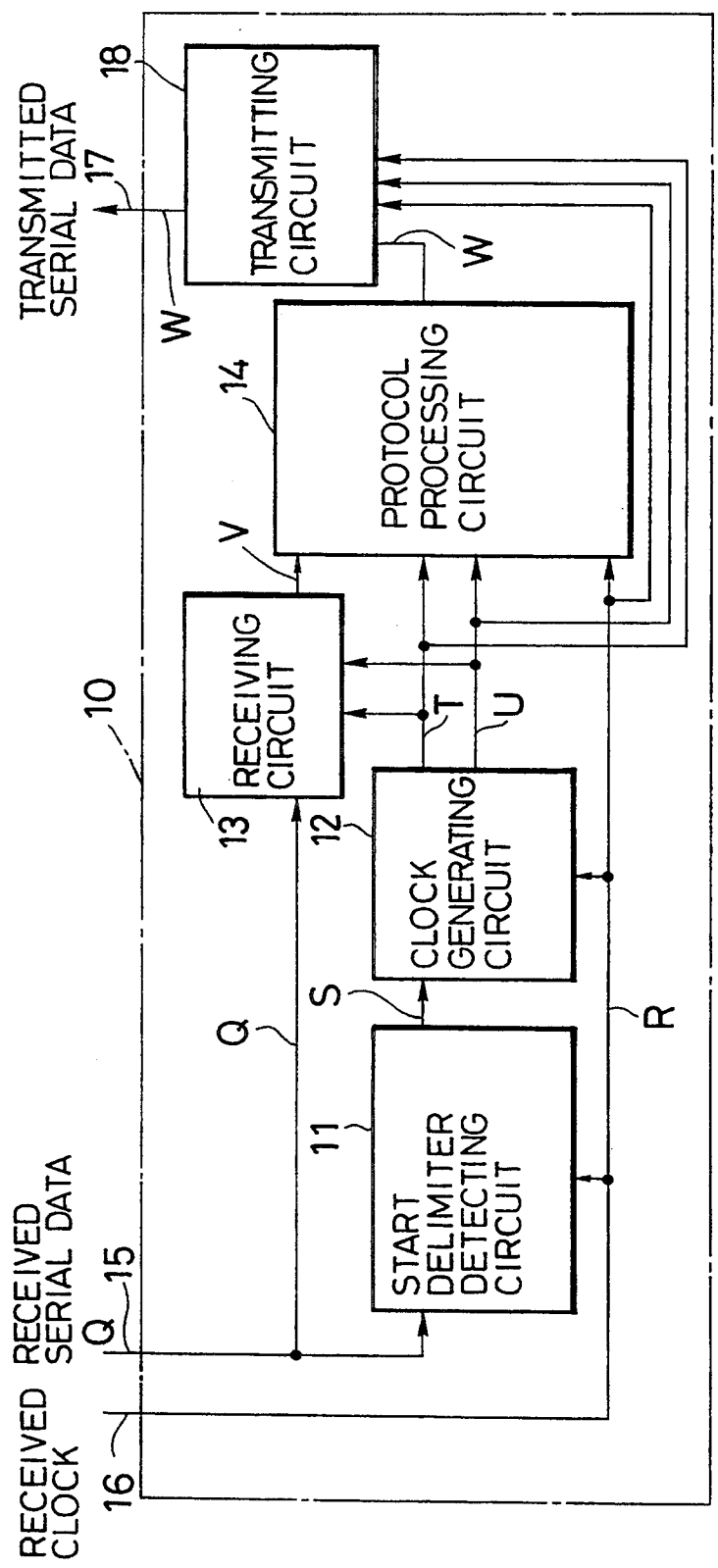
FIG. 6 is a block diagram representing one embodiment of a data transmitting/receiving apparatus.

Next, a data transmitting/receiving apparatus for which the clock generating apparatus is employed is shown in FIG. 6.

A data transmitting/receiving apparatus 10 constructs a repeating installation for realizing IEEE802.5 token ring LAN, comprising a start delimiter detecting circuit 11, a clock generating circuit 12, a receiving circuit 13, a protocol processing circuit 14, and a transmitting circuit 18. Then, serial data through a transmission line 15 and a basic clock signal through a transmission line 16 are input to the data transmitting/receiving apparatus 10, and a transmitting serial data is sent therefrom through a transmission line 17.

Figure 7:
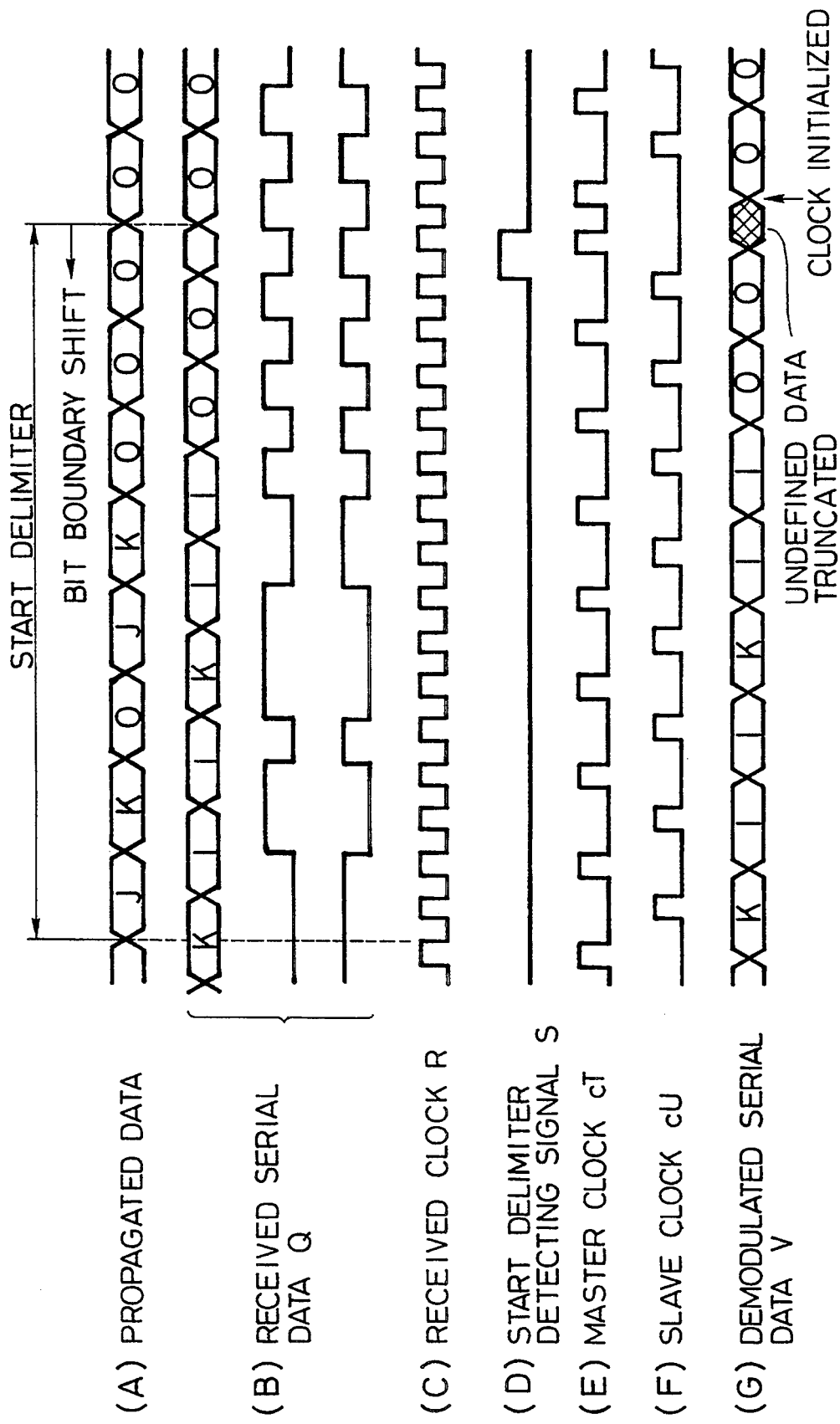
FIG. 7 is a time chart for illustrating an operation of the apparatus shown in FIG. 6.

Received serial data Q for propagating the transmission line 15 propagates the transmission line 15 on a modulation system called differential Manchester code. A data frame according to the code comprises a start delimiter SD, an access control AC, a destination address SA, a source address DA, information I, a frame check sequence FCS, an end delimiter ED and so forth, and the start delimiter SD which is data indicating the first of token and frame comprises an 8-bit long bit pattern represented as differential Manchester code: JK0JK000:. The pattern is factorized into a 17 half-bit long bit pattern :00011011100101010: or 11100100011010101:. The pattern has bits other than the first 0 or 1 construct patterns J, K, 0, 1 by 2 bits. Then, when the start delimiter of the serial data is input to the start delimiter detecting circuit 11, the detecting circuit 11 is constructed, as shown in FIG. 7, as period initializing signal generating means for generating a 1 half-bit time start delimiter detecting signal S at the point in time when the 17th half-bit of the start delimiter data is detected.

The clock generating circuit 12 comprises the flip-flops 1, 2, the inverter 3, the AND gates 4, 5, and the OR gate 6 shown in FIG. 1, and when a start delimiter detecting signal S is input to the 2-phase clock generating circuit 12, the master clock signal and the slave clock signal are initialized. Then, when a shift arises on a bit boundary between the transmitted data and the received serial data Q, phases are exchanged by initialization. Then the serial data Q is input to the receiving circuit 13 according to either the master clock signal or the slave clock signal having exchanged phases with each other. The serial data Q input to the receiving circuit 13 is transferred to the protocol processing circuit 14 as a demodulated serial data V. Then, a protocol process based on the communication convention of IEEE802.5 token ring LAN is applied to the data, which is output to the transmission line 17 through the transmitting circuit 18 as transmitted serial data W.

According to this embodiment, when a bit boundary of the transmitted data is shifted, phases are exchanged between the master clock signal and the slave clock signal, and then the serial data is transmitted according to either the master clock signal or the slave clock signal having exchanged phases with each other, therefore the serial data can be transmitted without delay. In this case, a 1 half-bit long truncated data is generated as the demodulated serial data V at the time of the phase exchange between the master clock signal and the slave clock signal, however, the protocol processing circuit 14 interprets only the demodulated serial data V after initialization, therefore the data transmission will be free from trouble.

Figure 8:
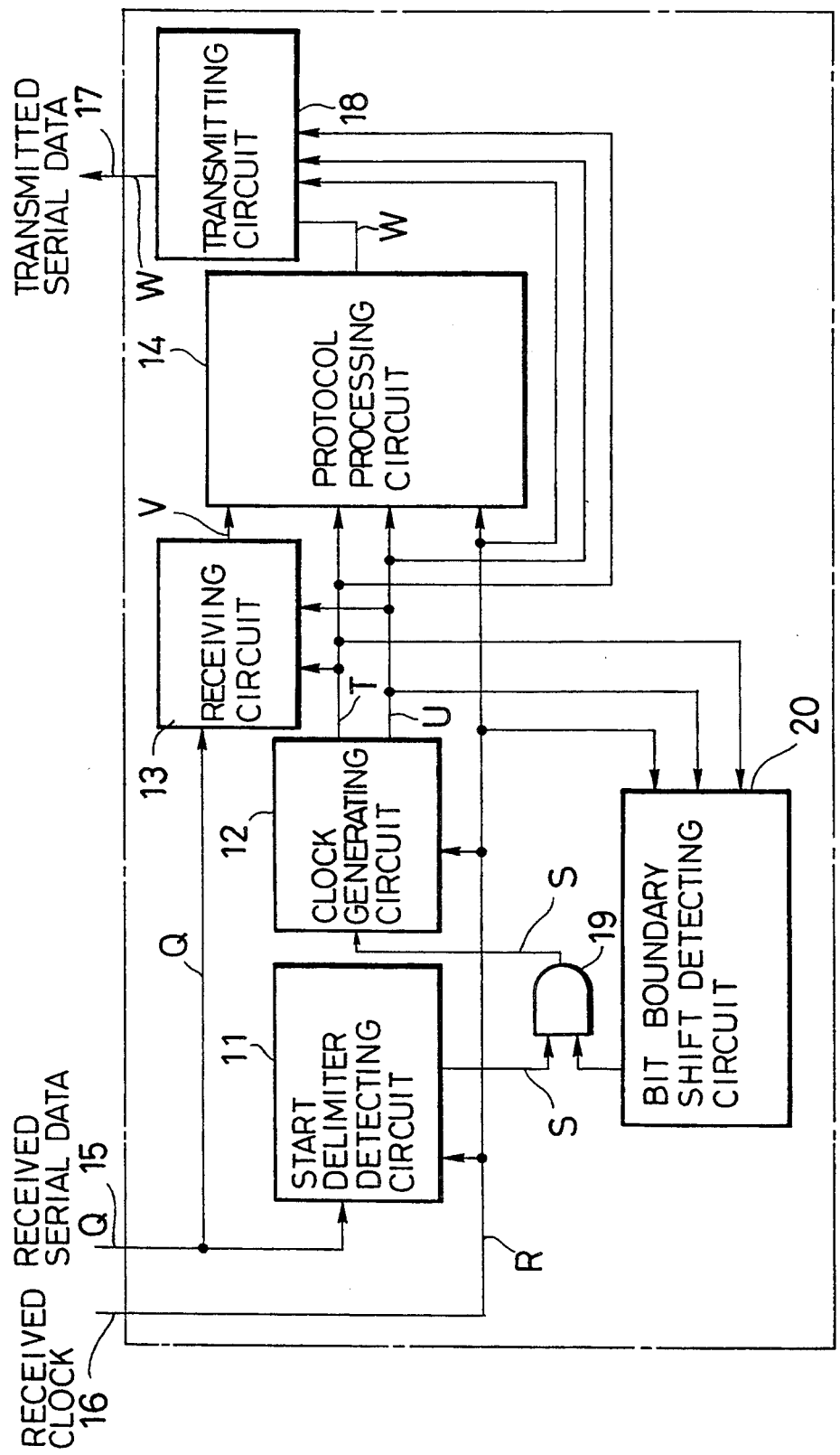
FIG. 8 is a block diagram showing another embodiment of the data transmitting/receiving apparatus.

Then, as shown in FIG. 8, an AND gate 19 is provided, a bit boundary shift detecting circuit 20 for detecting a shift of the bit boundary is provided, and an outgoing signal of the start delimiter detecting circuit 11 and an outgoing signal of the bit boundary shift detecting circuit 20 are input to the AND gate 19 in Construction, then the start delimiter detecting signal S can be transferred to the clock generating circuit 12 only when the start delimiter is detected and a shift arises on the bit boundary. In this case, phases of both the clock signals can be forcibly exchanged according to the start delimiter detecting signal S input to the clock generating circuit 12.

Meanwhile, the clock generating apparatus may comprise that with which the start delimiter detecting circuit 11 and the clock generating circuit 12 are provided, or that with which the clock generating circuit 12 and the bit boundary shift detecting circuit 20 are provided.

Figure 9:
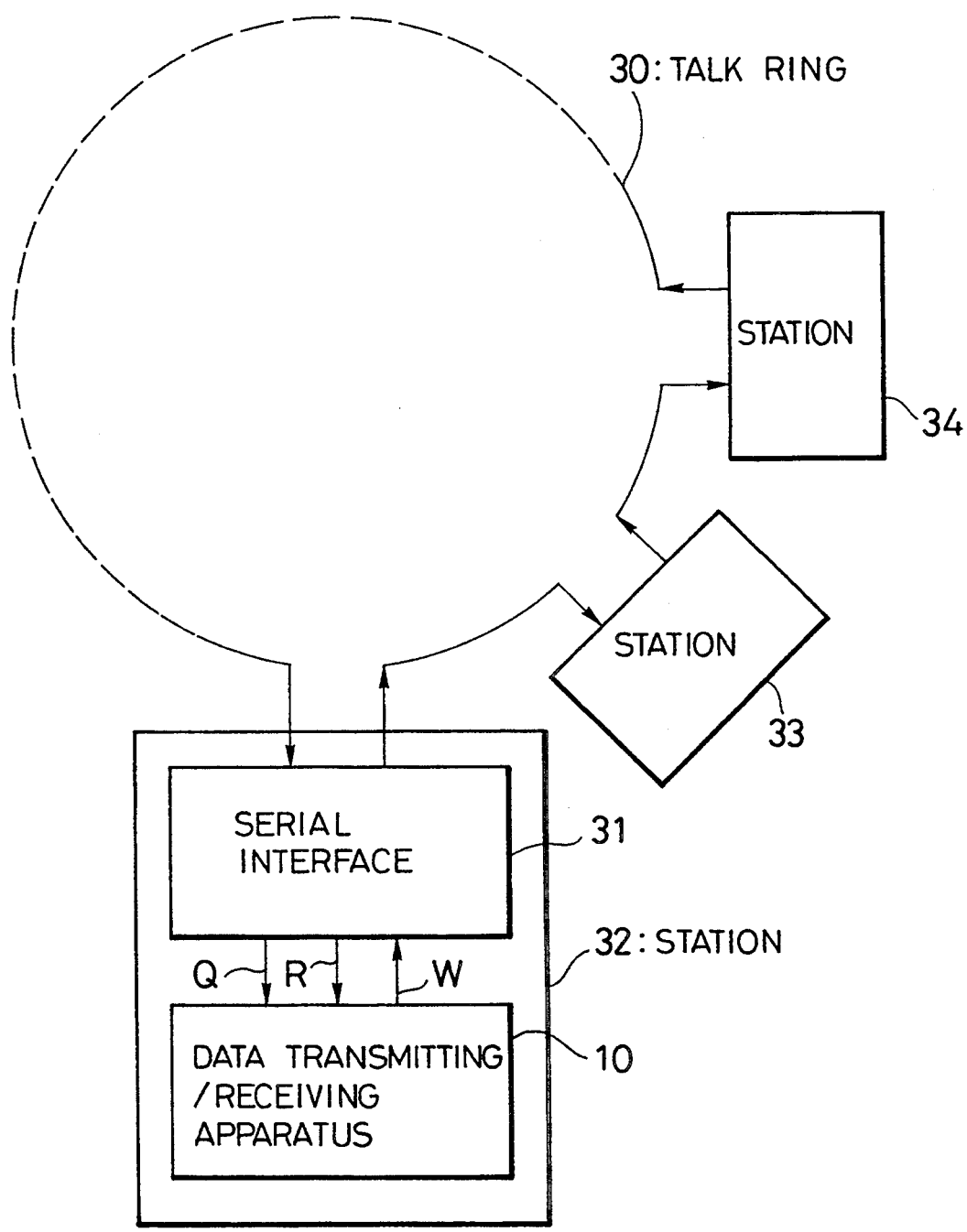
FIG. 9 is a block diagram showing an operative example when the data transmitting/receiving apparatus is applied to a token ring LAN system.

Next, in case, as shown in FIG. 9, where a token ring 30 is constructed of stations 32, 33, 34, the data transmitting/receiving apparatus 10 shown in FIG. 6 and a serial interface 31 are provided as a communication system of each station, then the data transmitting/receiving apparatus 10 may be applied to the token ring LAN system.

In this embodiment, where a shift arises on a bit boundary of received serial data when exchanging the serial data between each station, phases of the master clock signal and the slave clock signal are initialized by the data transmitting/receiving apparatus 10 of each station, and the serial data is transmitted according to either the master clock signal or the slave clock signal having the phases initialized as above, then the serial data can be transmitted late only by the time necessary for internal processing at each station. That is, when transmitting the received serial data as serial data for transmission, the data transmission is delayed by the time least necessary for the internal processing, but the data can be transmitted without delay due to a shift arising on the bit boundary.

Thus, according to this embodiment, since a delay in transmitting the serial data can be suppressed at each station, a deterioration of throughput can be prevented from the communication system as a whole.

For example, in the communication system comprising 200 stations, when exchanging data at 4 Mbps in transmission rate, if a phase lags 0.5 bits at each station as in the case of prior art system, then the data delays about 12.8 µS as the whole system, and thus the data for 50 bits will come to a standstill. Now, in the present embodiment, while the data transmission delays by the time (several nS) least necessary for internal processing at each station, such time is not so serious for the system as a whole, and a trouble will not result in the data transmission.

As described above, according to this invention, even in case a bit boundary of the transmitted data is shifted, since phases are exchanged between the master clock signal and the slave signal, and the data is transmitted according to either the master clock signal or the slave clock signal having the phases exchanged with each other, the data can be transmitted without delay, and a deterioration of throughput at the time of data transmission can be prevented.

What is claimed is:

1. A data transmitting/receiving apparatus, comprising:
    2-phase clock signal generating means for generating, upon receiving an input signal and a basic clock signal, 2-phase clock signals having a frequency which is one-half that of said basic clock signal and which differ in phase from each other by one-half the period of said basic clock signal;
    master clock signal generating means for generating a master clock signal representing a logical product of one of the 2-phase clock signals and said basic clock signal;
    slave clock signal generating means for generating a slave clock signal representing a logical product of the other of the 2-phase clock signals and the basic clock signal, the phase of said slave clock signal differing from the phase of said master clock signal by an amount equal to the period of said basic clock signal;
    period initializing signal generating means for generating a period initializing signal upon detection of a specific bit pattern of serial data input through an input line;
    logical means for receiving, as incoming signals, the period initializing signal and one of the 2-phase clock signals, and for producing a gate signal as the input signal to said 2-phase clock signal generating means in response to the received incoming signals;
    data input means for inputting serial data in accordance with either of said master clock signal and said slave clock signal;
    protocol processing means for protocol processing on said serial data input by said data input means and outputting processed serial data; and
    data output means for sequentially outputting said processed serial data to an output line in accordance with one of said master clock signal and said slave clock signal.

2. A data transmitting/receiving apparatus, comprising:
    2-phase clock signal generating means for generating, upon receiving an input signal and a basic clock signal, 2-phase clock signals having a frequency which is one-half that of said basic clock signal and which differ in phase from each other by one-half the period of said basic clock signal;
    master clock signal generating means for generating a master clock signal representing a logical product of one signal of the 2-phase clock signals and said basic clock signal;
    slave clock signal generating means for generating a slave clock signal representing a logical product of another signal of the 2-phase clock signals and said basic clock signal, the phase of said slave clock signal differing from the phase of said master clock signal by an amount equal to the period of said basic clock signal;
    period turnover signal generating means for generating a period turnover signal upon detection of a specific bit pattern of a serial data input through an input line;
    logical means for receiving said period turnover signal and one of said 2-phase clock signals, and for generating, as the input signal to said 2-phase clock signal generating means, a gate signal when one of said period turnover signal and one of said 2-phase clock signals is at a high level while the other of said period turnover signal and said one of said 2-phase clock signals is at a low level;
    data input means for inputting serial data in accordance with either of said master clock signal and said slave clock signal;
    protocol processing means for protocol processing said serial data input by said data input means; and
    data output means for sequentially outputting said serial data to an output line in accordance with one of said master clock signal and said slave clock signal.

3. A local area network communication transmitting/receiving apparatus operating as a data transmitting/receiving apparatus for a communication station disposed in a data transmission line, comprising:
    2-phase clock signal generating means for generating, upon receiving an input signal and a basic clock signal, 2-phase clock signals having a frequency which is one-half that of the basic clock signal and which differ in phase from each other by one-half the period of said basic clock signal;
    master clock signal generating means for generating a master clock signal representing a logical product of one signal of said 2-phase clock signals and said basic clock signal;
    slave clock signal generating means for generating a slave clock signal representing a logical product of another signal of the 2-phase clock signals and said basic clock signal, the phase of said slave clock signal differing from the phase of said master clock signal by an amount equal to the period of said basic clock signal;
    period initializing signal generating means for generating a period initializing signal upon detection of a specific bit pattern of a serial data input through said data transmission line;
    logical means for receiving, as incoming signals, the period initializing signal and one of the 2-phase clock signals, and for producing a gate signal as the input signal to said 2-phase clock signal generating means in response to the received incoming signals;

data input means for inputting serial data in accordance with either of said master clock signal and said slave clock signal;

protocol processing means for protocol processing on said serial data input by said data input means and outputting processed serial data; and data output means for sequentially outputting said processed serial data to an output line in accordance with one of said master clock signal and said slave clock signal.

4. A local area network communication transmitting-/receiving apparatus operating as a data transmitting-/receiving apparatus for a communication station disposed in a data transmission line, comprising:

2-phase clock signal generating means for generating, upon receiving an input signal and a basic clock signal, 2-phase clock signals having a frequency which is one-half that of said basic clock signal and which differ in phase from each other by one-half the period of said basic clock signal;

master clock signal generating means for generating a master clock signal representing a logical product of one signal of the 2-phase clock signals and the basic clock signal;

slave clock signal generating means for generating a slave clock signal representing a logical product of another signal of said 2-phase clock signals and said basic clock signal, the phase of said slave clock signal differing from the phase of said master clock signal by an amount equal to the period of said basic clock signal;

period turnover signal generating means for generating a period turnover signal upon detection of a specific bit pattern of serial data input through said data transmission line;

logical means for receiving said period turnover signal and one of said 2-phase clock signals, and for generating, as the input signal input to said 2-phase clock signal generating means, a gate signal when one of said period turnover signal and one of said 2-phase clock signals is at a high level while the other of said period turnover signal and said one of said 2-phase clock signals is at a low level;

data input means for inputting serial data in accordance with either of said master clock signal and said slave clock signal;

protocol processing means for protocol processing said serial data input by said data input means; and data output means for sequentially outputting the serial data to the data transmission line in accordance with one of said master clock signal and said slave clock signal.

5. A clock generating apparatus, comprising:

2-phase clock signal generating means for generating, upon receiving an input signal and a basic clock signal, 2-phase clock signals having a frequency which is one-half that of said basic clock signal and which differ in phase from each other by one-half the period of said basic clock signal;

master clock signal generating means for generating a master clock signal representing a logical product of one signal of said 2-phase clock signals and said basic clock signal;

slave clock signal generating means for generating a slave clock signal representing a logical product of another signal of said 2-phase clock signals and said basic clock signal, the phase of said slave clock signal differing from the phase of said master clock signal by an amount equal to the period of said basic clock signal;

period initializing signal generating means for generating a period initializing signal synchronized with said basic clock signal upon detection of a specific bit pattern of serial data input through a data transmission line; and logical means for receiving said period initializing signal and one of said 2-phase clock signals, and for generating a gate signal as the input signal to said 2-phase clock signal generating means.

6. A clock generating apparatus, comprising:

2-phase clock signal generating means for generating, upon receiving an input signal and a basic clock signal, 2-phase clock signals having a frequency which is one-half that of said basic clock signal and which differ in phase from each other by one-half the period of said basic clock signal;

master clock signal generating means for generating a master clock signal representing a logical product of one signal of said 2-phase clock signals and said basic clock signal;

slave clock signal generating means for generating a slave clock signal representing a logical product of another signal of said 2-phase clock signals and said basic clock signal, the phase of said slave clock signal differing from the phase of said master clock signal by an amount equal to the period of said basic clock signal;

period turnover signal generating means for generating a period turnover signal synchronized with said basic clock signal upon detection of a specific bit pattern of serial data input through a data transmission line; and logical means for receiving said period turnover signal and one of said 2-phase clock signals, and for generating a gate signal as the input signal to said 2-phase clock signal generating means.

7. A method of transmitting/receiving data wherein 2-phase clock signals different in phase are generated according to a basic clock signal, said method comprising the steps of:

producing a master clock signal representing a logical product of one signal of said 2-phase clock signals and said basic clock signal;

producing a slave clock signal as a logical product of another signal of said 2-phase clock signals and said basic clock signal;

inputting serial data in accordance with one of said master clock signal and said slave clock signal;

exchanging, when a shift occurs on a bit boundary of said input serial data for outputting in accordance with either of said master clock signal and said slave clock signal after a protocol process is applied to said input serial data, respective phases of said master clock signal and said slave clock signal with each other; and transmitting and receiving serial data in accordance with either of said master clock signal and said slave clock signal having their respective phases exchanged with each other.

8. A clock generating apparatus for producing a master clock signal and a slave clock signal from a basic clock signal, comprising:

a first input terminal for inputting said basic clock signal;

a second input terminal for inputting a period initializing signal synchronized with said basic clock signal;

a first output terminal for outputting said master clock signal;

a second output terminal for outputting said slave clock signal;

gate signal generating means for generating a gate signal in response to a clock signal obtained by frequency-dividing said basic clock signal input to said first input terminal and said period initializing signal input to said second input terminal;

first basic clock signal frequency-dividing means for frequency-dividing said basic clock signal, upon receiving said basic clock signal input to said first input terminal and said gate signal, and outputting said frequency-divided basic clock signal;

signal turnover means for turning over said basic clock signal input to said first input terminal and for outputting said turned-over basic clock signal;

second basic clock signal frequency dividing means for generating, upon receiving said output signal from said first basic clock frequency-dividing means and said output from said signal turnover means, two kinds of clock signals having a frequency which is one-half that of said basic clock signal and which differ in phase by one-half the period of said basic clock signal, said second basic clock frequency-dividing means outputting one of said two kinds of clock signals to said gate signal generating means;

master clock signal generating means for generating and outputting a master clock signal representing a logical product of one of said output signals of said first basic clock signal frequency-dividing means and said second basic clock signal frequency-dividing means and said basic clock signal input to said first input means; and slave clock signal generating means for generating and outputting a slave clock signal subject to another logical product of other output signals of said first basic clock signal frequency-dividing means and said second basic clock signal frequency-dividing means and said basic clock signal, the phase of said slave clock signal differing from the phase of said master clock signal by an amount equal to the period of said basic clock signal.

9. A data transmitting/receiving apparatus for receiving serial data, subjecting it to a protocol conversion to transmission, comprising:

a first input terminal for inputting said serial data;

a second input terminal for inputting a basic clock signal;

a first output terminal for outputting a master clock signal;

a second output terminal for outputting a slave clock signal;

period initializing signal generating means for generating a period initializing signal according to said input serial data and said basic clock signal;

gate signal generating means for generating a gate signal in response to a clock signal obtained by frequency-dividing said basic clock signal input to said first input terminal and said period initializing signal input to said second input terminal;

first basic clock signal frequency-dividing means for frequency-dividing said basic clock signal, upon receiving said basic clock signal input to said first input terminal and said gate signal, and outputting said frequency-divided basic clock signal;

signal turnover means for turning over said basic clock signal input to said first input terminal and for outputting said turned-over basic clock signal;

second basic clock signal frequency dividing means for generating, upon receiving said output signal from said first basic clock frequency-dividing means and said output from said signal turnover means, two kinds of clock signals having a frequency which is one-half that of said basic clock signal and which differ in phase by one-half the period of said basic clock signal, said second basic clock frequency-dividing means outputting one of said two kinds of clock signals to said gate signal generating means;

master clock signal generating means for generating and outputting to a first output terminal a master clock signal representing a logical product of one of said output signals of said first basic clock signal frequency-dividing means and said second basic clock signal frequency-dividing means and said basic clock signal input to said first input means;

slave clock signal generating means for generating and outputting a clock signal to a second output terminal subject to another logical product of other output signals of said first basic clock signal frequency-dividing means and said second basic clock signal frequency-dividing means and said basic clock signal, the phase of said slave clock signal differing from the phase of said master clock signal by an amount equal to the period of said basic clock signal;

data input means for inputting said serial data in accordance with either of said master clock signal or said slave clock signal;

protocol processing means for applying a protocol process to said serial data input said data input means; and data output means for outputting said serial data subjected to said protocol process to said first and second output terminals.

* * * * *